Aug. 19, 1947. F. C. MOCK 2,426,153
CHARGE FORMING DEVICE
Original Filed Jan. 2, 1937
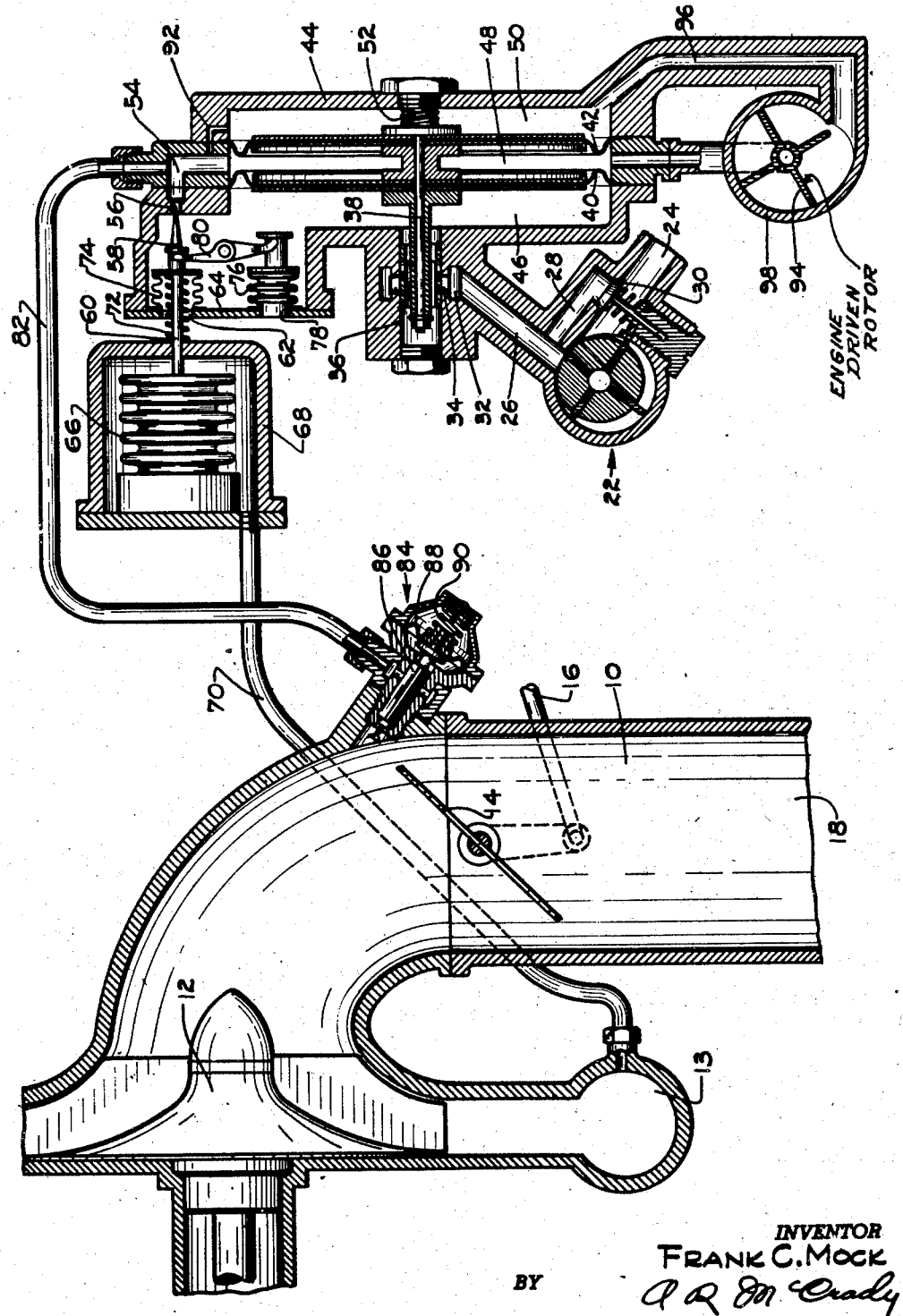
INVENTOR
FRANK C. MOCK
BY
ATTORNEY Patented Aug. 19, 1947

2,426,153

UNITED STATES PATENT OFFICE 2,426,153

CHARGE FORMING DEVICE

Frank C. Mock, South Bend, Ind., assignor to Bendix Products Corporation, South Bend, Ind., a corporation of Indiana Application April 15, 1938, Serial No. 202,206, which is a continuation of application Serial No. 118,718, January 2, 1937. Divided and this application October 21, 1940, Serial No. 362,085

43 Claims. (Cl. 123—119)

This invention relates to fuel feeding devices or systems for internal combustion engines and more particularly to devices or systems in which liquid fuel is supplied under positive pressure to a current of air and is mixed therewith to form a combustible mixture. The present application discloses certain improvements in the devices disclosed in my United States Patent No. 2,008,143, granted July 16, 1935, and is a division of my copending application Serial No. 202,206, filed April 15, 1938, now Patent No. 2,390,658, granted December 4, 1945, which in turn is a continuation of my co-pending but now abandoned application Serial No. 118,718 filed January 2, 1937.

One of the principal objects of the invention is to supply the liquid fuel under positive pressure, the fuel supply being regulated to maintain a proper fuel-to-air ratio. This arrangement causes the fuel to be atomized under pressure to produce a better mixture and keeps the fuel under atmospheric or superatmospheric pressure at all times, thereby eliminating boiling of the fuel and insuring accurate metering.

Another object of the invention is to eliminate the formation of ice in the fuel mixing device; a function which is particularly important in the case of aircraft flying at high altitudes. This is accomplished by injecting the fuel into a warm or hot part of the manifold system or the like posterior to the throttle.

Another object is to provide a fuel feeding device or system which will operate properly in any position so that when it is installed on aircraft the engine will be properly supplied with fuel regardless of the position of flight. This is highly important during maneuvers of different kinds at which time an adequate fuel supply is indispensable.

The invention has for still another object to provide a fuel supply system for an anterior throttle carburetor whereby the fuel and air ratio is maintained within close limits.

A further object is to provide a fuel feeding system in which the fuel flow is jointly regulated in accordance with the speed of the engine and the density of the charge entering the engine.

This fuel supply apparatus, while especially applicable to fuel supply regulating systems of the character hereinafter particularly described, is not limited to such uses, but is obviously available, with or without modification, in a great variety of cases where fuel is to be supplied under more or less analogous conditions against substantial back pressure; as, for example, that afforded by the spring of an injection valve, or by internal pressure in the vessel or chamber into which the fuel is introduced. While a principal utility of the invention is in connection with aircraft engines, it is also applicable to engines of other types or those used for other purposes.

Further objects and advantages of the invention will be apparent to one skilled in the art from the following detailed description, taken in connection with the accompanying drawing. Although but one embodiment is shown, skilled persons will understand that many variations may be made without departing from the principles disclosed; and I contemplate the employment of any structures, arrangements, or modes of operation that are properly within the scope of the appended claims.

In the figure there is shown an induction passage 10 leading to a rotary blower or supercharger 12 of an internal combustion engine, the supercharger outlet ring 13 being in direct communication with the intake ports of the engine cylinders. A throttle 14 operated by a rod 16 extending from the pilot's cockpit controls the passage 10, thus the pilot controls directly the air flow to the engine while the fuel flow is automatically controlled by the apparatus hereinafter described. In some cases a second supercharger may be employed to supply air at higher than atmospheric pressure to the entrance 18 of passage 10, and in such cases the supercharger 12 serves both to step up the pressure and as a fuel mixer and distributor. In other cases the entrance 18 is merely flared and opens in the direction of travel of the craft so that the inertia of the entering air will build up a pressure above atmospheric at the entrance, which is in some cases referred to as the air scoop. An instrumentality such as the blower 12 is not essential to the invention, but is here shown as representing approved practice in aircraft engines.

Any known or suitable fuel pump, capable of supplying fuel under positive pressure, is provided, the one indicated at 22 being of the sliding vane type having an inlet 24 receiving fuel from a source, an outlet 26, and a return bypass 28 controlled by a pressure responsive valve 30. The pump thus delivers fuel through passage 26 to an annular chamber 32 having outlet ports 34 controlled by a sleeve valve 36. Any other type of balanced valve (a valve unaffected by the differential in pressure across the valve) may be used in place of the sleeve valve, such, for example, as the diaphragm balanced poppet valve disclosed in my copending application Serial No. 202,206, now Patent No. 2,390,658. A rod 38 carries the sleeve 36 and is connected to a pair of spaced diaphragms 40 and 42. A casing 44 encloses and supports the diaphragms and is divided thereby into three chambers 46, 48 and 50. A spring 52 may be used to urge the rod 38 in a direction to open the valve 36 for idling.

The chambers 46 and 48 are connected by a passage 54 having a metering restriction 56 controlled by a needle valve 58. The valve 58 is connected to or formed integral with a valve stem 60 which extends through an aperture 62 in a plate 64 and is connected to a sealed bellows 66. A fixed casing 68 surrounds and supports the bellows and is connected to the supercharger outlet ring 13 by a pipe 70 so that the bellows is subjected to manifold pressure and to some extent manifold temperature. A compression spring 72 may be provided to urge the valve 58 toward its closed position and, particularly if the bellows is partially or completely evacuated, to extend the bellows to a normal balanced position from which it may move in either direction as the manifold pressure varies.

The stem 60 is preferably surrounded by and connected to a small sealing bellows 74 at the point where the stem passes through aperture 62 to provide a fluid-tight, frictionless packing. The effect of fuel pressure on this bellows is preferably balanced out by a similar bellows 76 sealing a second aperture 78 in the plate 64 and acting on one end of a lever 80 which is pivoted at its center and engages the valve 58 at its other end. In this way the valve 58 is free to move in response to the altimetric bellows 66 and is unaffected by the fuel pressure in chamber 46.

Fuel under pressure thus flows from the fuel pump 22 to chamber 32, through ports 34 controlled by valve 36, into chamber 46, through calibrated restriction 56 controlled by the valve 58, into chamber 48 and thence through a pipe 82 leading to a fuel discharge nozzle indicated generally at 84, positioned in the conduit 10 posterior to the throttle.

The discharge jet 84 is provided with a valve 86 opening away from the manifold and connected to a flexible diaphragm 88. Fuel under pressure entering through the pipe 82 acts on one face of the diaphragm 88 tending to open the valve 86, and is opposed by a spring 90. The discharge jet 84 may be of any known type, a number of which are disclosed and claimed in the copending application of Mock and Partington Serial No. 243,067, filed November 30, 1938, now Patent No. 2,310,984, granted February 16, 1943, and in my copending application Serial No. 350,517, filed August 3, 1940, now Patent No. 2,372,332, granted March 27, 1945.

The chambers 48 and 50 are connected, preferably at the tops thereof, through a restricted vent 92 to permit escape of air. The chamber 48 is also connected to the inlet of a centrifugal type pump including a rotor 94 driven by the engine. The pump outlet is connected by a pipe 96 to the chamber 50 which, except for vent 92, is otherwise closed.

The rotor 94 is arranged in a casing 98 which does not closely engage the blades thereof so that liquid is not positively displaced thereby. However, operation of the rotor builds up a pressure in the outlet pipe 96 and the chamber 50 which is greater than the pressure in chamber 48. Since the discharge passage of the pump 94 leads to the chamber 50 which is substantially closed, the differential between the pressures in chambers 50 and 48 is maintained proportional to the square of the rotor or engine speed and urges diaphragm 42 in a direction to open valve ports 34. As the valve ports 34 are opened the fuel flow increases, thereby increasing the differential in the pressures across the metering orifice 56 and creating a force on the diaphragm 40 in a direction tending to close the ports 34.

In operation the chambers 46, 48 and 50 and the pump casing 98 are filled with fuel. The pressure in chamber 48, as determined by the pressure responsive discharge nozzle 84, acts in opposite directions on diaphragms 40 and 42, thereby having no effect on the valve 36. As a consequence, the pressures in chambers 46 and 50 will be maintained equal, except as modified by extraneous forces such as idle spring 52, by the opening or closing of the valve 36 in response to any unbalance. The differential in the pressures in chambers 46 and 48 is effective to create flow through the metering restriction 56 and is maintained equal to the differential in pressures in the chambers 48 and 50, the value of this differential being proportional to the square of the engine speed as hereinbefore pointed out. It therefore follows that the square root of the fuel metering differential pressure is maintained proportional to engine speed.

The area of the metering restriction 56 is regulated by the valve 58 in response to changes in the length of bellows 66 resulting from changes in the pressure or density of the charge being delivered to the engine cylinders from the supercharger ring 13. The area of the fuel metering orifice is thus regulated in accordance with charge density.

It is generally known that since the number of cylinders and the displacement of each cylinder in an engine remains constant, the weight of air used by an engine is, within reasonably close limits, proportional to the product of charge density and engine speed. Also, the quantity of fuel flowing through an orifice is proportional to the product of the area of the orifice and the square root of the differential pressure across the orifice. Therefore, by controlling the orifice area by bellows 66 in accordance with the absolute pressure of the charge supplied to the cylinders, and controlling the square root of the differential pressure across the fuel metering orifice in proportion to engine speed, the ratio of air to fuel will be maintained in constant proportion.

The idle spring 52 acts in a direction to open valve 36, thereby increasing the fuel metering differential pressure required to balance the diaphragm-valve assembly. At low differential pressures corresponding to idle operation the small force of the spring is of material effect and produces a relatively large percent increase in fuel flow, thereby providing a rich mixture at idle, as is desired. At high differential pressures the spring force is negligible and has substantially no effect on the fuel-air ratio.

At conditions of high power output corresponding to high charge densities it is generally desirable to increase the richness of the mixture. This may be readily accomplished by properly shaping the contour of valve 58. If the valve 58 is arranged to maintain the effective area of the metering orifice directly proportional to the charge density, a constant mixture ratio will be obtained. However, if the needle contour is such as to increase the orifice area more rapidly when the charge density reaches or exceeds a predetermined value, the richness of the mixture will be correspondingly increased, thereby providing a power enrichment as is generally desired.

It is thus apparent that the basic structure will provide a substantially constant mixture richness, but by introducing an extraneous force on the valve stem 58 or by varying the fuel metering orifice area, any fuel metering characteristic may be obtained. Means other than pump 94 might also be used to create a force on valve stem 38 which varies as the square of engine speed, or other changes might be made without departing from the principles of the invention and I contemplate the use of any such arrangements properly falling within the scope of the subjoined claims.

I claim:

1. A device for controlling the supply of fuel to an engine comprising a conduit for conducting fuel to the engine, a fuel pressure responsive variable restriction adjacent the outlet of said conduit, a valve in said conduit, yieldable means urging said valve toward open position, a flexible element connected to said valve, and means adapted to be driven by the engine for creating fluid pressures on said element variable in response to variations in engine speed to control said valve.

2. A device for controlling the supply of fuel to an engine comprising a connection for conducting fuel to the engine, a valve in said connection, a metering orifice in said connection, pressure responsive control means connected to said valve, a vane type of pump adapted to be driven by the engine for creating fluid pressures on one side of said control means variable in response to variations in engine speed and tending to open said valve, and means connecting said connection between said valve and orifice to the other side of said control means, whereby fuel pressure will balance said first named pressure.

3. A device for controlling the supply of fuel to an engine comprising a connection for conducting fuel to the engine, a valve in said connection, a metering orifice in said connection, pressure responsive control means connected to said valve, means for creating a pressure on one side of said control means variable in response to variations in engine speed, and means connecting said connection between said valve and orifice to the other side of said control means, whereby fuel pressure will balance said first named pressure, and means responsive to the density of an air charge entering the engine for controlling said orifice.

4. A device for controlling the supply of fuel to an engine comprising a connection for conducting fuel to the engine, a valve in said connection, a metering restriction in said connection posterior to the valve, a diaphragm connected to said valve, one face of said diaphragm communicating with said connection between the valve and restriction and the other face of said diaphragm communicating with said connection posterior to the restriction, and means adapted to be driven by the engine for creating a force on the valve variable in response to variations in engine speed.

5. A device for supplying fuel to an engine comprising a fuel pump, a connection for conducting fuel from said pump to the engine, a valve in said connection, a metering orifice in said connection posterior to the valve, a pair of spaced diaphragms connected to said valve, the outside face of one of said diaphragms communicating with said connection between the valve and orifice and the space between said diaphragms communicating with said connection posterior to the orifice, and means driven by the engine for creating a force on the outside face of the other diaphragm variable in response to variations in engine speed, and means responsive to the density of an air charge entering the engine for controlling said orifice.

6. A device for controlling the supply of fuel to an engine comprising a connection for conducting fuel to the engine, a valve in said connection, a metering orifice in said connection posterior to the valve, a pair of spaced diaphragms connected to said valve, the outside face of one of said diaphragms communicating with said connection between the valve and orifice and the space between said diaphragms communicating with said connection posterior to the orifice, and a centrifugal pump adapted to be driven by the engine and having its inlet connected to the space between said diaphragms and its outlet connected to the outside face of the other diaphragm.

7. A device for supplying fuel to an internal combustion engine comprising a source of fuel under pressure, a connection from said source to the engine, means to control the pressure of the fuel supplied by said source, means to control the effective area of said connection, a device responsive to the density of the air supplied to the engine for controlling one of said means, and a device operated by a force varying in response to variations in engine speed to control the other of said means.

8. In a charge forming device for an internal combustion engine, an induction passage, a source of fuel under pressure, a fuel conduit leading from said source to said induction passage, a fuel pressure responsive variable restriction adjacent the outlet of said conduit, a regulating valve in said conduit, means for exerting a force on said valve in the opening direction substantially proportional to the square of engine speed, means responsive to pressure in the fuel conduit posterior to the valve for exerting a force on the valve in the closing direction, a second valve in said conduit posterior to the first mentioned valve, and means for urging said second valve toward open position in accordance with increase in pressure in the induction passage.

9. A device for supplying fuel mixture to an internal combustion engine comprising an induction passage, a fuel pump, a connection from said pump to the induction passage to supply fuel thereto, a pressure responsive variable restriction in said connection adjacent its outlet, a valve in said connection, an orifice in said connection, means including a fluid pressure creating means for creating a force proportional to the square of the engine speed to urge said valve toward open position as the engine speed increases, and means responsive to the pressure drop across said orifice to urge said valve toward closed position as the pressure drop increases.

10. The invention defined in claim 9 together with means responsive to variations in the density of the charge entering the engine for controlling the effective area of said orifice.

11. A device for supplying fuel mixture to an internal combustion engine comprising an induction passage, a source of fuel, a connection from said source to the induction passage for delivering fuel thereto, a valve in said connection, an orifice in said connection, two spaced diaphragms connected to said valve, means driven by the engine for creating a differential in pressure across one diaphragm urging the valve toward open position, and means for subjecting the other diaphragm to a differential pressure varying with the pressure drop across the orifice and urging said valve toward closed position.

12. The invention defined in claim 11 together with means responsive to the pressure of the charge entering the engine for controlling the effective area of said orifice.

13. A device for controlling the supply of fuel to an engine comprising a fuel conduit, a valve in said conduit, an orifice in said conduit posterior to said valve, a pair of spaced diaphragms connected to said valve, the outer face of one of said diaphragms communicating with the conduit between the valve and the orifice, the space between the diaphragms communicating both with the conduit posterior to the orifice and through a restricted passageway with the outer face of the second of said diaphragms to enable removal of air and vapor from the outside face, and an engine driven pump having its inlet connected to the space between the diaphragms and its outlet connected to said last named outside face.

14. A device for supplying fuel mixture to an internal combustion engine comprising an induction passage, a conduit for fuel under pressure leading to the induction passage and having a wall provided with an aperture, a valve regulating fuel flow through said conduit and including an actuating member extending through said aperture, means responsive to variations in density in the induction passage and connected to said actuating member to control the position of said valve, a flexible element subjected to fuel pressure in said conduit closing said aperture and secured to said wall and said actuating member in fluid-tight relation to permit movement of the actuating member relative to said wall, said wall being provided with a second aperture spaced from said first aperture, a second flexible element closing said second aperture and connected to the actuating member so as to exert upon said actuating member a force opposite to the force exerted upon said actuating member by the first mentioned flexible member.

15. In a fuel supplying device for an engine, a conduit for conducting fuel to the engine, a metering element in said conduit, means for varying the effective area of the metering element, means for varying the pressure drop across said element, a device operated by a force variable in response to variations in engine speed to control one of said means, and a device responsive to variations in the pressure of the engine air supply to control the other of said means.

16. A device for controlling the supply of fuel to an engine comprising a conduit for conducting fuel to the engine, a metering restriction in said conduit, a regulating valve, pressure responsive control means connected to said valve for varying the flow through said conduit, means adapted to be driven by the engine for creating a force variable in response to variations in engine speed tending to open said valve, connections from the conduit anterior and posterior to the metering restriction to opposite sides respectively of said control means whereby fuel pressure will oppose said force, and a spring urging said valve toward open position for increasing the fuel flow to the engine, particularly at low engine speeds.

17. In a fuel supplying system for an engine, a connection for conducting fuel to the engine, means including an engine driven member operable under substantially all conditions of engine operation for creating a force substantially proportional to the square of the engine speed, means for creating a force varying as a function of the rate of fuel flow through the connection, and means responsive to said forces for varying the flow through the connection during periods of engine operation.

18. The invention defined in claim 17 comprising in addition means responsive to variations in the pressure of the air supply to the engine for further varying the flow through the connection.

19. In a fuel supplying device for an engine, a fuel pump, a connection for conducting fuel to the engine, means for varying the flow capacity of said connection during periods of engine operation to thereby control the quantity of fuel delivered to the engine, a device operated by a force variable in response to variations in engine speed to control said means and arranged to increase the flow capacity upon increase in engine speed, and a device responsive to variations in the pressure of the air supply to the engine to further control said means and adapted to increase the flow capacity upon increase in said pressure.

20. A device for supplying fuel mixture to an internal combustion engine comprising an induction passage, a throttle in said passage, a fuel pump, a pressure responsive nozzle discharging into the induction passage, a connection from the pump to said nozzle for supplying fuel thereto, a metering orifice in said connection, a valve for varying the flow through said connection, means for creating a force substantially proportional to the square of the engine speed to urge said valve in a direction to increase the fuel flow, and means for creating a force proportional to the pressure drop across said orifice to urge said valve in a direction to decrease the fuel flow.

21. The invention defined in claim 20 comprising in addition means responsive to variations in the pressure in the induction passage posterior to the throttle for further controlling the flow through said connection.

22. A charge forming device comprising an induction passage, a pressure responsive fuel nozzle discharging in said induction passage, a fuel pump, a connection from the pump to said nozzle, a second fuel pump for creating a force variable in response to variations in engine speed, means for creating a force variable in response to variations in the flow through the connection, and valve means responsive to said forces for varying the flow through said connection during periods of engine operation.

23. A device for supplying fuel mixture to an internal combustion engine comprising an induction passage, a throttle for variably restricting the induction passage, fluid transmitting connection leading to the induction passage to supply fuel thereto, a metering element in said connection, a pair of valves in the connection respectively anterior and posterior to the metering element, means responsive to the fuel pressure in the connection between one of the valves and the metering element for controlling said one valve, means responsive to the fuel pressure in the connection between the other valve and the metering element for controlling the other of said valves, and means driven by the engine for modifying the control effected by one of the fuel pressure responsive means in accordance with variations in engine speed.

24. In a fuel supplying system for an engine, a fuel conduit for supplying fuel to the engine, means including an engine driven rotor for creating fluid pressures variable with variations in engine speed, a metering element in the conduit, and a pair of valves in the conduit on opposite sides of the metering element, each being responsive to the fuel pressure in the conduit between it and the metering element and at least one of the valves being also responsive to the said fluid pressures.

25. A device for supplying fuel to an engine comprising a fuel conduit receiving fuel under pressure, a fuel metering element in the conduit, a valve in the conduit, pressure responsive control means connected to said valve, rotatable means adapted to be driven by the engine for creating a valve opening force variable in response to variations in engine speed, means connecting the fuel conduit between the valve and metering element to said control means, whereby fuel pressure will oppose said force, and means responsive to variations in air density for increasing the fuel supply to the engine with increase in air density.

26. In a fuel supplying system for an internal combustion engine, an induction passage, a connection from a source of fuel to the engine including a fuel conduit, a fuel metering element in the conduit, means for maintaining a substantially constant fuel pressure in the conduit on one side of the element, means for varying the fuel pressure in the conduit on the other side of the element to thereby variably control the quantity of fuel supplied to the engine during periods of engine operation, means for varying the effective area of the metering element to likewise variably control the quantity of fuel supplied to the engine during periods of engine operation, means including an element responsive to pressures in the induction passage for controlling one of said varying means, and means including an engine driven fluid pressure creating means for controlling the other of said varying means.

27. In a device for supplying fuel to an engine, a conduit for conducting fuel to the engine, means including a fluid pumping member adapted to be driven by the engine for variably controlling the quantity of fuel delivered to the engine in accordance with variations in engine speed during substantially all periods of engine operation, and means creating a force varying as a function of the rate of flow through said conduit for modifying the control effected by the first mentioned means.

28. In a fuel supplying system for an engine, a connection for conducting fuel from a source of fuel to the engine, a metering element in the connection for creating a fuel differential pressure variable in response to variations in the flow of fuel therethrough, a fluid pump adapted to be driven by the engine for creating a differential pressure variable in accordance with variations in engine speed, and valve means responsive to the said differential pressures for varying the fuel flow through the connection.

29. A device for supplying fuel to an internal combustion engine comprising an induction passage, a source of fuel, a connection from said source to the engine to supply fuel thereto, a metering element in said connection for creating a differential fuel pressure, valve means controlling the connection, an engine driven fluid pump having an inlet and an outlet, and means responsive to the said differential fuel pressure and to the differential between the pressures at the inlet and outlet of the fluid pump for controlling the valve means.

30. The invention defined in claim 29 comprising in addition means responsive to variations in the pressure in the intake manifold of the engine for varying the effective area of the metering element.

31. In a device for supplying fuel to an engine, a fuel conduit, a metering orifice in the conduit, a centrifugal fuel pump to be driven by the engine and having an inlet connected to the conduit and an outlet leading to a substantially closed chamber, and valve means responsive to the differential fuel pressure created by the metering orifice and to the pressure in said chamber for controlling the flow of fuel through said conduit.

32. The invention defined in claim 31 comprising in addition means responsive to the pressure in the engine manifold for controlling the fuel flow through said conduit.

33. In a device for supplying fuel to an engine, a fuel conduit, valve means for controlling the fuel flow through the conduit, an engine driven vane type of pump, a substantially closed chamber forming the sole outlet for the pump, and means responsive to the pressure in the chamber for controlling the valve means.

34. In a device for supplying fuel to an engine, a fuel conduit, a fuel pump supplying fuel under pressure to the conduit, a fuel metering element in the conduit, a fluid pump, the outlet for the pump being of substantially constant effective area, a valve controlling the conduit, and means responsive to the pressure in the said outlet and to the differential fuel pressure created by the metering element for controlling the said valve.

35. A device for supplying fuel to an engine comprising a conduit for conducting fuel under pressure to the engine, a valve in said conduit, yieldable means urging said valve toward open position, a flexible element connected to said valve, means driven by the engine for creating a force variable in response to variations in engine speed urging said valve toward open position, and means for subjecting said flexible element to a differential in fuel pressures varying with variations in fuel flow to the engine and urging said valve toward closed position.

36. A device for supplying fuel to an engine comprising a connection for conducting fuel to the engine, a valve in said connection, a metering restriction in said connection, pressure responsive control means connected to said valve, means adapted to be driven by the engine for creating a force variable in response to variations in engine speed urging said valve toward open position, and means connecting said connection between said valve and restriction to the said control means, whereby fuel pressure will balance said force.

37. In a charge forming device for an internal combustion engine, an induction passage, a source of fuel under pressure, a fuel conduit leading from said source to said induction passage, a regulating valve in said conduit, means for exerting a force on said valve in the opening direction substantially proportional to the square of engine speed, means responsive to variations in pressure in the fuel conduit posterior to the valve for exerting a force on the valve in the closing direction, a second valve in said conduit posterior to the first mentioned valve, and means for urging said second valve toward open position in accordance with increase in pressure in the induction passage.

38. A device for supplying fuel to an engine comprising an air passage, a fuel pump, a connection from said pump to the air passage to supply fuel thereto, a valve in said connection, an orifice in said connection, means for creating a force substantially proportional to the square of the engine speed to urge said valve toward open position as the engine speed increases, means responsive to variations in the pressure drop across said orifice to urge said valve toward closed position as the pressure drop increases, and means responsive to variations in the engine air supply pressure for varying the rate of fuel supply to the engine at any given engine speed.

39. In a fuel supplying system for a combustion engine, a fuel pump, a connection for conducting fuel from the pump to the engine, means operable under substantially all conditions of engine operation for creating a force varying as a function of the engine speed, means for creating a force varying as a function of the rate of fuel flow through the connection, and means responsive to said forces acting in opposition to each other for varying the flow through the connection during periods of engine operation.

40. A charge forming device comprising an induction passage, a pressure responsive fuel nozzle discharging in said induction passage, a fuel pump, a connection from the pump to said nozzle, means for creating a force variable in response to variations in engine speed, means for creating a force variable in response to variations in the flow through the connection, and valve means responsive to said forces for varying the flow through said connection during periods of engine operation.

41. A pressure carburetor for an internal combustion engine, said carubetor having an air entrance, a throttle valve therein, a source of fuel under pressure, an entrance for said fuel, an engine-driven pump which generates pressure in proportion to the square of the revolutions per minute of the engine, a moving wall responsive on one side to said variable pressure, means for admitting fuel to the other side of the moving wall, means for controlling the fuel pressure to balance the pressure generated by the pump, a fuel chamber associated with said moving wall in which the fuel pressure is maintained at the pressure of said pump, a valve controlling the outlet from said chamber, an air outlet from said carburetor, and means responsive to the pressure in said outlet for opening said valve in proportion to an increase in the pressure in said outlet.

42. A pressure carburetor for an internal combustion engine, said carburetor having a source of fuel under pressure, an air entrance to the carburetor, an engine-driven pump which generates pressure in proportion to the square of the revolutions per minute of the engine, a moving wall responsive on one side to said variable pressure, means for admitting fuel to the other side of the moving wall, means for controlling the fuel pressure to balance the pressure generated by the pump, a fuel chamber associated with said moving wall in which the fuel pressure is thus maintained at the pressure of said pump, a valve controlling the outlet from said chamber, a supercharger for said engine, and means responsive to the pressure created by said supercharger for opening said valve in proportion to an increase of pressure created by said supercharger.

43. The method of controlling the supply of fuel to an engine comprising, creating a force varying as a function of engine speed, creating a force varying as a function of the rate of fuel flow to the engine, and utilizing said forces acting in opposition to each other for variably controlling the fuel supply to the engine.

FRANK C. MOCK.

REFERENCES CITED

The following references are of record in the file of this patent:

UNITED STATES PATENTS

| Number | Name | Date |
| --- | --- | --- |
| 2,004,869 | Hogg | June 11, 1935 |
| 1,955,037 | Viel | Apr. 17, 1934 |
| 2,165,447 | Browne | July 11, 1939 |
| 2,129,613 | Wunsch | Sept. 6, 1938 |

FOREIGN PATENTS

| Number | Country | Date |
| --- | --- | --- |
| 429,682 | England | June 4, 1935 |